United States Patent
Kim

(10) Patent No.: US 11,068,463 B2
(45) Date of Patent: Jul. 20, 2021

(54) SYSTEM AND METHOD FOR MANAGING LOG DATA

(71) Applicant: Machbase, Inc., Seoul (KR)

(72) Inventor: Sung Jin Kim, Seoul (KR)

(73) Assignee: Machbase, Inc., Seoul (KR)

( * ) Notice: Subject to any disclaimer, the term of this patent is extended or adjusted under 35 U.S.C. 154(b) by 486 days.

(21) Appl. No.: 15/682,086

(22) Filed: Aug. 21, 2017

(65) Prior Publication Data
US 2019/0057125 A1    Feb. 21, 2019

(30) Foreign Application Priority Data
Aug. 16, 2017 (KR) .......................... 10-2017-0103319

(51) Int. Cl.
G06F 16/23    (2019.01)
G06F 16/27    (2019.01)

(52) U.S. Cl.
CPC .......... *G06F 16/2358* (2019.01); *G06F 16/27* (2019.01)

(58) Field of Classification Search
None
See application file for complete search history.

(56) References Cited

U.S. PATENT DOCUMENTS

| 7,395,131 | B2 * | 7/2008 | Funk | G05B 15/02 700/108 |
| 9,047,108 | B1 * | 6/2015 | Rajaa | G06F 9/4856 |
| 9,166,988 | B1 * | 10/2015 | Shin | H04L 63/14 |
| 9,262,519 | B1 * | 2/2016 | Saurabh | G06F 16/285 |
| 9,507,843 | B1 * | 11/2016 | Madhavarapu | G06F 16/2358 |
| 9,602,530 | B2 * | 3/2017 | Ellis | G06F 21/52 |
| 10,338,977 | B2 * | 7/2019 | Yoon | G06F 16/285 |
| 2002/0169889 | A1 * | 11/2002 | Yang | H04L 29/06 709/244 |
| 2005/0160427 | A1 * | 7/2005 | Ustaris | G06F 16/113 718/100 |
| 2008/0243751 | A1 * | 10/2008 | Gormish | G06F 16/93 |
| 2008/0243752 | A1 * | 10/2008 | Gormish | G06F 16/93 |
| 2008/0243753 | A1 * | 10/2008 | Gormish | G06F 16/489 |

(Continued)

FOREIGN PATENT DOCUMENTS

| KR | 10-2009-0000278 A | 1/2009 |
| KR | 10-2012-003567 A | 1/2012 |

(Continued)

*Primary Examiner* — Ashish Thomas
*Assistant Examiner* — Mellissa M. Ohba
(74) *Attorney, Agent, or Firm* — Studebaker & Brackett PC

(57) ABSTRACT

A system and method for efficiently managing log data to be transferred to a DBMS (database management system). The system includes a processor that detects a change in a log file and reads a log message; performs a first preprocessing to change the content of the log message when it is decided that inputting the log message to the DBMS is necessary, and that changing of the content of the log message is necessary; generates column data by parsing on the first preprocessed log message and separating the parsed log message into columns; performs a second preprocessing to change the content of the column data when it is decided that inputting the column data to the DBMS is necessary, and that changing of the content of the column data is necessary; and provides the second preprocessed column data to the DBMS.

13 Claims, 3 Drawing Sheets

(56) References Cited

U.S. PATENT DOCUMENTS

| | | | |
|---|---|---|---|
| 2011/0185234 A1* | 7/2011 | Cohen | G06F 11/3476 714/37 |
| 2014/0344236 A1* | 11/2014 | Xiao | G06F 16/2358 707/696 |
| 2015/0254296 A1* | 9/2015 | Bourbonnais | G06F 16/2282 707/675 |
| 2016/0028758 A1* | 1/2016 | Ellis | G06F 21/52 726/25 |
| 2016/0210344 A1* | 7/2016 | Bourbonnais | G06F 16/23 |
| 2016/0246867 A1* | 8/2016 | Bourbonnais | G06F 11/2035 |
| 2016/0292263 A1* | 10/2016 | Ferrar | G06F 16/248 |
| 2016/0299934 A1* | 10/2016 | Karandikar | G06F 16/2358 |
| 2016/0378577 A1* | 12/2016 | Russell | G06F 16/248 719/318 |
| 2018/0157713 A1* | 6/2018 | Huang | G06F 16/24568 |

FOREIGN PATENT DOCUMENTS

| | | |
|---|---|---|
| KR | 10-2012-0082176 A | 7/2012 |
| KR | 10-2012-0082179 A | 7/2012 |

\* cited by examiner

SYSTEM AND METHOD FOR MANAGING LOG DATA

CROSS-REFERENCE TO RELATED APPLICATIONS

A claim for priority under 35 U.S.C. § 119 is made to Korean Patent Application No. 10-2017-0103319 filed Aug. 16, 2017, in the Korean Intellectual Property Office, the entire contents of which are hereby incorporated by reference.

BACKGROUND

This work was supported by Seoul Metropolitan City funded by the Korean Government (CI160025)

The present invention relates to a system and method for managing log data, more particularly to a system and method for managing log data that can efficiently manage log data information transferred to a DBMS (database management system) by the use of user script.

Generally, a log data management system that includes a log analyzer may read a log file from a particular location, perform parsing using a regular expression configured beforehand, and input the log data divided into columns to a DBMS (database management system).

In a log management system, there are also processes that are performed based on user input, as the designation of the input data location (directory, ftp location, sftp location, or socket, etc.) for log data, the DBMS access information regarding where the output data for the log data is to be inputted, and the regular expression for parsing log messages can be performed based on user input.

Also, the log analyzer of a log management system may automatically detect changes in the log file at a designated location and read the newly inputted log message. For a log message thus read, parsing may be performed using a regular expression designated via user input. The result of the parsing may be transmitted to the DBMS.

Here, by configuring the processing such that unimportant log messages are not even allowed input and the values of a particular column are not inputted to the DBMS, it is possible to significantly reduce the amount of log data stored and to thereby increase data processing efficiency. In particular, if the values of a particular column can be converted with reference to other log data during input to the DBMS, it is possible to provide increased convenience in future data searches.

At present, however, the log analyzer is provided in the form of an independent program, so that in order to implement the functions above, one has to personally modify the code of the log analyzer according to user input, and such process of modifying the log analyzer code can be very complicated.

In other words, implementing the functions mentioned above may require writing a program may according to user input and compiling the written program.

Therefore, there is a need for a technological development that can improve the limits of the conventional log analyzer in an efficient manner.

SUMMARY

An objective of the invention is to provide a system and method for managing log data that can efficiently manage log data transferred to a DBMS (database management system) based on user script.

A log data management system according to an embodiment of the invention may be a system that is implemented by way of a computing terminal as a system for managing log data. The log data management system may include: a log collector part configured to detect a change in a log file that is composed of log data and read a log message, which includes newly inputted log data information; a first preprocessing command generator part configured to receive the log message via the log collector part, decide whether or not to input the log message to a DBMS (database management system) or whether or not to change a content of the log message, and generate a command to preprocess the log message according to the decision; a log analyzer part configured to preprocess the log message according to the command generated at the first preprocessing command generator part, perform parsing on the preprocessed log message, and generate column data by separating the parsed log message into columns; and a log transmitter part configured to provide the column data of the log analyzer part to the DBMS.

Also, the system may further include a second preprocessing command generator part that is configured to receive the column data of the log analyzer part, decide whether or not to input the column data to the DBMS or whether or not to change a content of the column data, and generate a command to preprocess the column data according to the decision, where the log transmitter part may preprocess the column data according to the command generated at the second preprocessing command generator part and may provide the preprocessed column data to the DBMS.

Also, the first preprocessing command generator part may use user script language to perform procedures for the deciding regarding the log message received from the log collector part and the generating of the preprocessing command.

Also, the second preprocessing command generator part may use user script language to perform procedures for the deciding regarding the column data of the log analyzer part and the generating of the preprocessing command.

The user script language may be ASP, PHP, JSP, PYTHON, PERL, or RUBY.

Also, the log analyzer part may perform the parsing according to a preconfigured regular expression.

Also, the preconfigured regular expression may be changed by user input.

Also, the second preprocessing command generator part may, if there is a change in the content of the column data, generate a preprocessing command to change the content of the column data based on a comparison with the content of other column data.

A method for managing log data according to an embodiment of the invention may be implemented by way of a computing terminal and may include: detecting a change in a log file composed of log data and reading a log message, which includes newly inputted log data information; generating a first preprocessing command by deciding whether or not to input the log message to a DBMS (database management system) or whether or not to change a content of the log message and generating a command to preprocess the log message according to the decision; generating column data by preprocessing the log message according to the first preprocessing command, performing parsing on the preprocessed log message, and separating the parsed log message into columns; generating a second preprocessing command by receiving the column data, deciding whether or not to input the column data to the DBMS or whether or not to change a content of the column data, and generating a command to preprocess the column data according to the decision; and preprocessing the column data according to the second preprocessing command and providing the preprocessed column data to the DBMS.

Also, the generating of the first preprocessing command may include performing the deciding regarding the log message and the generating of the first preprocessing command using user script language, while the generating of the second preprocessing command may include performing the deciding regarding the column data and the generating of the second preprocessing command using user script language.

An aspect of the invention makes it possible to efficiently process user defined logic which cannot be processed by a log analyzer.

Also, functions for deciding whether or not to input a log message and changing the log message can be performed in an effective manner using a relatively simple user input procedure.

Additional aspects and advantages of the present invention will be set forth in part in the description which follows, and in part will be obvious from the description, or may be learned by practice of the invention.

DETAILED DESCRIPTION

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

Figure 1:
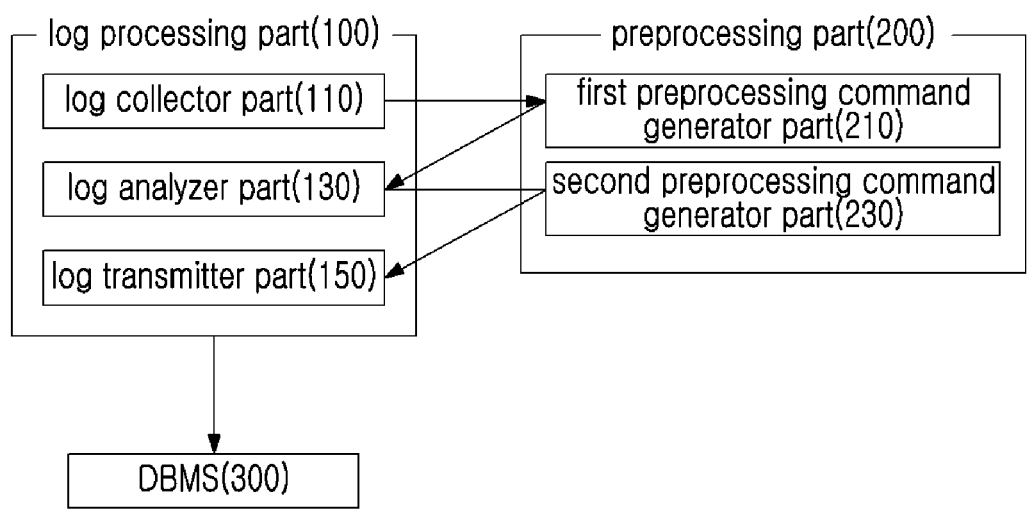
FIG. 1 is a block diagram illustrating the composition of a log data management system according to an embodiment of the invention.

First, a description is provided below, with reference to FIG. 1, of the composition of a log data management system according to an embodiment of the invention. FIG. 1 is a block diagram illustrating the composition of a log data management system according to an embodiment of the invention.

Basically, a log data management system according to an embodiment of the invention relates to a system that is implemented by way of a computing terminal and is configured for managing log data. Generally, when parsing and analyzing log data, a regular expression that follows user definitions may be applied. Also, there may be user demands for preprocessing the log data before the inputted log data is subjected to parsing by the applying of a regular expression or for preprocessing the data (log data or column data) after the parsing; more specifically, there may be user demands for preventing unnecessary data from being inputted to the DBMS (database management system) or changing the data values before they are inputted or other demands.

A user would have to write a program to implement such functions, but if an environment is provided that enables the user to configure the log analyzer by using simple script language without having to perform compiling during the process of writing the program, it would be possible to perform the above functions in an effective manner.

Taking a brief overview of the related art regarding this aspect, a log analyzer (log processing part) may read a log file from a particular location, parse the log file using a regular expression configured beforehand, and input the log data divided into columns to a DBMS. The user may designate the input data location (directory, ftp location, sftp location, or socket, etc.) and configure DBMS access information regarding where the output data is to be inputted as well as the regular expression for parsing the log message. The log processing part may automatically detect changes in the log file at a designated location and read the newly inputted log message. The log message thus read may be parsed using a designated regular expression. Finally, the result of the parsing may be transmitted to the DBMS.

In this context of the related art, providing designations to the system, such that unimportant log messages and the values of certain unnecessary columns are not allowed input, could increase efficiency by reducing the amount of stored log data. Also, if the values of a particular column could be converted with reference to other data during input, it would provide greater convenience in the future during a data search. However, since the log analyzer (log processing part) is provided in the form of an independent program, a user would have to personally modify the code of the log analyzer in order to implement the functions above.

To address the demands mentioned above, an embodiment of the present invention allows the user's script to preprocess an inputted log message before it is transferred to the log analyzer (log processing part) and allows a parsed log message to be preprocessed by user script.

As illustrated in FIG. 1, a log data management system according to an embodiment of the invention can include a log processing part 100, a preprocessing part 200, and a DBMS 300.

More specifically, the log processing part 100 may be the part that directly processes log messages and can include a log collector part 110, a log analyzer part 130, and a log transmitter part 150.

The preprocessing part 200 may be the part that generates a user processing command by which the log message at the log processing part 100 may be processed appropriately. The preprocessing part 200 can include a first preprocessing command generator part 210 and a second preprocessing command generator part 230.

The DBMS 300 may correspond to the element that stores and manages data that includes log information, such as the log messages, etc.

The log collector part 110 included in the log processing part 100 may detect a change in the log file, which may be composed of log data, to read a log message, which may include the newly inputted log data information.

The first preprocessing command generator part 210 may receive the log message via the log collector part 110, make a decision on whether or not to input to the DBMS 300 or whether or not to change the content of the log message, and generate a command for preprocessing the log message according to the decision.

The log analyzer part 130 may preprocess the log message according to the command generated at the first preprocessing command generator part 210, perform parsing on the preprocessed log message, and separate the parsed log message into columns to generate column data.

Also, the log analyzer part 130 can perform the parsing according to a preconfigured regular expression. Here, the preconfigured regular expression can be changed by way of user input.

The second preprocessing command generator part 230 may receive the column data of the log analyzer part 130 to make a decision on whether or not to input to the DBMS 300 or whether or not to change the content of the column data, and then generate a command for preprocessing the column data according to the decision.

Also, if there is a change made to the content of the column data, the second preprocessing command generator part 230 may generate a preprocessing command for changing the content of the column data by way of a comparison with the content of other column data.

Also, the log transmitter part 150 may provide the column data of the log analyzer part 130 to the DBMS 300, and in cases where preprocessing is needed for the column data, may preprocess the column data according to the command generated at the second preprocessing command generator part 230 and provide the preprocessed column data to the DBMS 300.

Also, the first preprocessing command generator part 210 can perform the procedures of making a decision regarding the log message received from the log collector part 110 and generating the preprocessing command by way of user script language.

Also, the second preprocessing command generator part 230 can perform the procedures of making a decision regarding the column data of the log analyzer part 130 and generating the preprocessing command by way of user script language.

To give specific examples, the user script language can be ASP, PHP, JSP, PYTHON, PERL, or RUBY.

Figure 2:
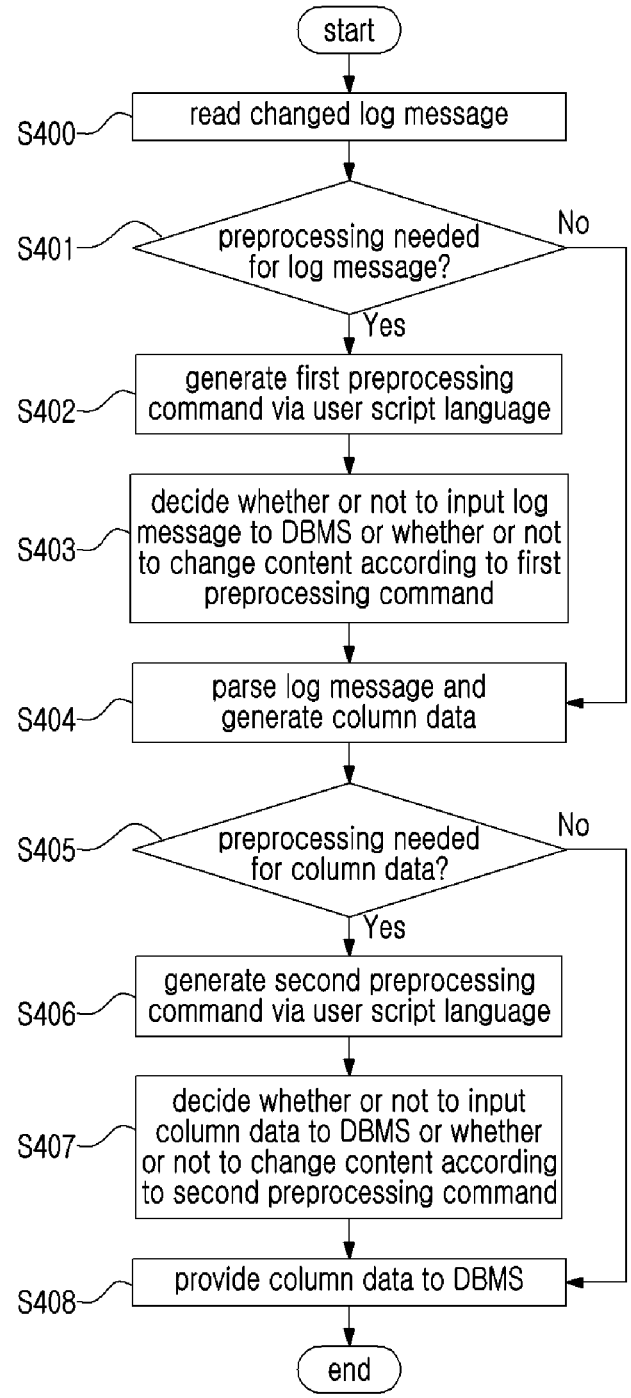
FIG. 2 is a flowchart illustrating a log data management method according to an embodiment of the invention.

Next, a description is provided below, with reference to FIG. 2, of a method for managing log data according to an embodiment of the invention. FIG. 2 is a flowchart illustrating a log data management method according to an embodiment of the invention.

As illustrated in FIG. 2, a log data management method according to an embodiment of the invention may begin with reading a changed log message (S400) and then determining whether or not preprocessing is needed for the log message (S401).

If the result of the determining is that no preprocessing is needed for the log message, then the method may continue to the process of parsing the log message and generating column data (go to operation S404). If the result of the determining is that preprocessing is needed for the log message, then a first preprocessing command may be generated via user script language (S402). Then, it may be decided whether or not to input the log message to the DBMS or whether or not to change the content of the log message according to the first preprocessing command (S403). After processing the log message according to the decision, parsing may be performed on the log message and column data may be generated (S404).

Then, it may be determined whether or not preprocessing is needed for the generated column data (S405). If preprocessing is not needed for the column data, then the column data may be provided directly to the DBMS (go to S408), and if preprocessing is needed for the column data, then a second preprocessing command may be generated in regard to the column data via user script language (S406). According to the second preprocessing command, it may be decided whether or not to input the column data to the DBMS or whether or not to change the content of the column data (S407). If it is decided that the column data is to be inputted to the DBMS or that there is to be a content change, then the column data may be provided to the DBMS with the changed content (S408).

Lastly, a description is provided below, with reference to FIG. 3, of the procedures by which a system and method for managing log data according to an embodiment of the invention may be implemented on an actual computing terminal.

Figure 3:
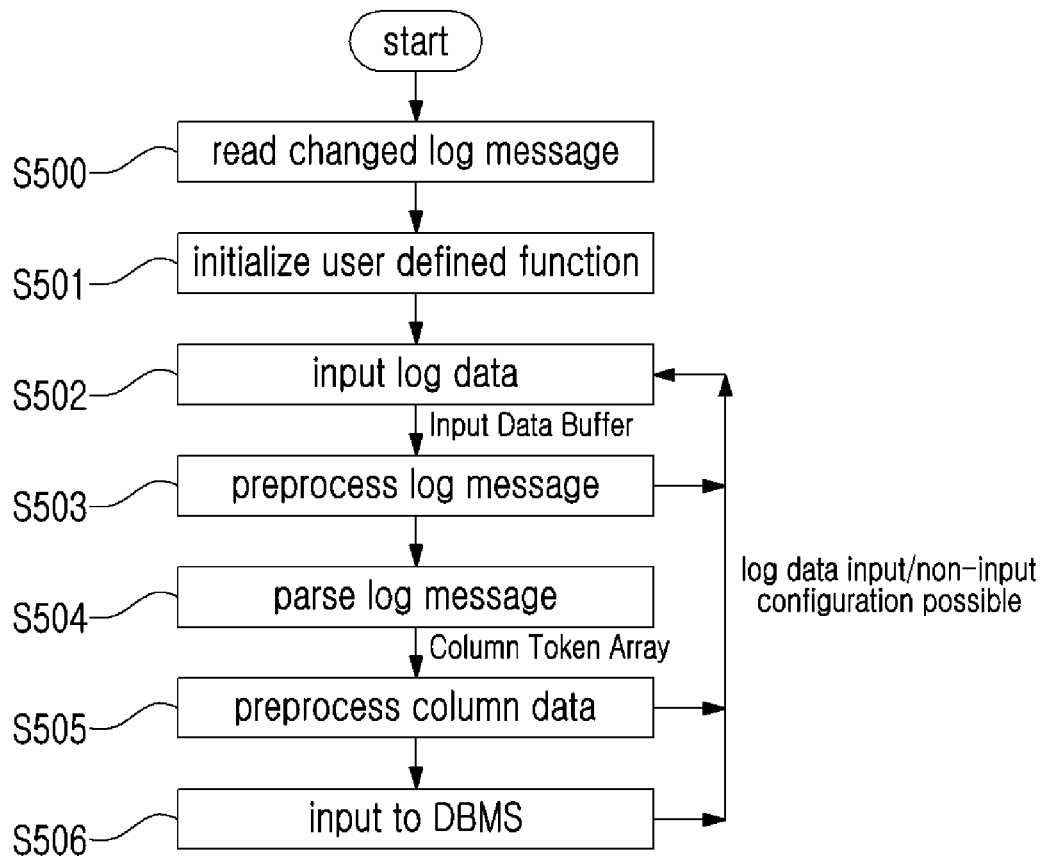
FIG. 3 is a diagram schematically illustrating the procedures by which a log data management system according to an embodiment of the invention may be implemented on an actual computing terminal.

FIG. 3 is a diagram schematically illustrating the procedures by which a log data management system according to an embodiment of the invention may be implemented on an actual computing terminal.

As illustrated in FIG. 3, when a log data management system according to an embodiment of the invention is implemented on an actual computing terminal, certain procedures may be necessary for configuring user defined functions, etc., that are processed according to user input.

To give a more specific example of the procedures that may be involved when an embodiment of the invention is applied to an actual computing terminal, a changed log message may first be read (S500), and a process of initializing user defined functions may be performed (S501) for processing the log message. Then, the processing for inputting the log data may be performed (S502). Here, the log data input processing refers to the procedure of inputting the data into the buffer (Input Data Buffer). In this state, the log message may be preprocessed (S503), and the log message may be parsed (S504). During this parsing process, column data may be generated where data is arranged divided into columns (Column Token Array). Afterwards, the column data may be preprocessed (S505). Finally, the column data that has passed through the procedures above may be inputted to the DBMS (S506).

From among the processes considered above, the processes for initializing the user defined functions (S501), preprocessing the log message (S503), and preprocessing the column data (S505) can, in particular, be performed according to user defined functions that are determined according to user input. In other words, the instructions can be written in user script language, and the log processor can perform the processes for the preprocessing, etc., mentioned above according to the instructions.

Also, as regards the illustration in FIG. 3, it is possible to configure the settings regarding the input/non-input of log data in the processes of preprocessing the log message (S503) and preprocessing the column data (S505). To be more specific, decisions can be made whether or not to input the log data to the DBMS by a preprocessing of the log data before parsing, whether or not the log data is to undergo parsing after the log data is changed before the parsing, whether or not the column data is to be inputted to the DBMS after parsing, and whether or not the column data is to be changed before being inputted to the DBMS.

In FIG. 3, the user defined functions can define the following three functions for a long file.

First, during the procedure of initializing the user defined functions, the variables used in the user defined functions may be defined and initialized. Also, during the procedure of preprocessing the log message, the inputted log message may be transferred to the user script before the log analyzer part conducts the parsing. Using the content of the log message, the user can configure whether or not to input the corresponding message and can change the transferred log message. Lastly, during the procedure of preprocessing the column data, the log message may be transferred to the user script before the log analyzer part parses the log message and inputs it to the DBMS. The log message may be parsed according to a regular expression and transferred as values separated into columns, and the user can configure whether or not to input the parsed column data or change the column data.

More specifically, the log processing part may execute a preconfigured script for initializing user defined functions. The user script can be written in python language, for example, can perform actions such as declaring and initializing global variables, etc., that will be used later by the user in the preprocessing functions. The log processing part may read the log file at a designated location and transfer it to the script that preprocesses the log file (first preprocessing command generator part). Lastly, the log processing part may parse the log message and transfer it to the column data preprocessing script (second preprocessing command generator part).

A system and method for managing log data according to an embodiment of the invention makes it possible to effectively process user defined logic that cannot be processed efficiently by a log analyzer. Also, the functions for deciding whether or not to input a log message or changing a log message can be performed effectively through a comparatively simple user input process (through user script language).

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on said operating system. Also, the processing device can access, store, manipulate, process, and generate data in response to an execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents.

Therefore, various other implementations, various other embodiments, and equivalents of the invention disclosed in the claims are encompassed by the scope of claims set forth below.

What is claimed is:

1. A system for managing log data, the system implemented by way of a computing terminal, the system comprising:
  a hardware processor configured to:
  detect a change in a log file composed of log data and read a log message including newly inputted log data information;
  determine, when the change in the log the is detected, whether or not to input the log message to a database management system (DBMS) or whether or not to change a content of the log message;
  in response to determinations that inputting the log message to the DBMS is necessary, and that changing of the content of the log message is necessary, generate a first command to perform a first preprocessing of the log message to change the content of the log message according to the generated first command, and perform parsing on the first preprocessed log message;
  in response to a determination that changing of the content of the log message is not necessary, perform parsing on the read log message;
  generate column data by separating the parsed log message into columns;
  determine whether or not to input the generated column data to the DBMS or whether or not to change a content of the generated column data;
  in response to determinations that inputting the generated column data to the DBMS is necessary, and that changing of the content of the generated column data is necessary, generate a second command to perform a second preprocessing of the generated column data to change the content of the generated column data according to the generated second command and provide the second preprocessed column data to the DBMS; and in response to a determination that changing of the content of the generated column data is not necessary, provide the generated column data to the DBMS.

2. The system for managing log data according to claim 1, wherein the processor is further configured to use user script language to perform procedures for deciding whether or not to input the log message to the DBMS or whether or not to change the content of the log message and for generating the first command.

3. The system for managing log data according to claim 1, wherein the processor is further configured to use user script language to perform procedures for deciding whether or not to input the column data to the DBMS or whether or not to change the content of the column data and for generating the second command.

4. The system for managing log data according to claim 2, wherein the user script language is ASP, PHP, JSP, PYTHON, PERL, or RUBY.

5. The system for managing log data according to claim 1, wherein the processor is further configured to perform the parsing according to a preconfigured regular expression.

6. The system for managing log data according to claim 5, wherein the preconfigured regular expression is configured to be changed by user input.

7. The system for managing log data according to claim 1, wherein the processor is further configured to generate the second command based on a comparison with a content of other column data, when it is decided that changing the column data is necessary.

8. The system for managing log data according to claim 3, wherein the user script language is ASP, PHP, JSP, PYTHON, PERL, or RUBY.

9. A method for managing log data, the method implemented by way of a computing terminal, the method comprising:

detecting a change in a log file composed of log data and reading a log message including newly inputted log data information;

determining, when the change in the log file is detected, whether or not to input the log message to a database management system (DBMS) or whether or not to change a content of the log message;

in response to determinations that inputting the log message to the DBMS is necessary, and that changing of the content of the log message is necessary, generating a first command, performing a first preprocessing of the log message to change the content of the log message according to the generated first command, and performing parsing on the first preprocessed log message;

in response to a determination that changing of the content of the log message is not necessary, performing parsing on the read log message;

generating column data by separating the parsed log message into columns;

determining whether or not to input the generated column data to the DBMS or whether or not to change a content of the generated column data;

in response to determinations that inputting the generated column data to the DBMS is necessary, and that changing of the content of the generated column data is necessary, generating a second command, performing a second preprocessing of the generated column data to change the content of the generated column data according to the generated second command, and providing the second preprocessed column data to the DBMS; and in response to a determination that changing of the content of the generated column data is not necessary, providing the generated column data to the DBMS.

10. The method for managing log data according to claim 9, wherein the deciding whether or not to input the log message to the DBMS or whether or not to change the content of the log message and the generating the first command are performed by using user script language.

11. The method for managing log data according to claim 9, wherein the deciding whether or not to input the column data to the DBMS or whether or not to change the content of the column data and the generating the second command are performed by using user script language.

12. The method for managing log data according to claim 10, wherein the user script language is ASP, PHP, JSP, PYTHON, PERL, or RUBY.

13. The method for managing log data according to claim 11, wherein the user script language is ASP, PHP, JSP, PYTHON, PERL, or RUBY.

\* \* \* \* \*